US011030153B2

(12) United States Patent
Nicholls

(10) Patent No.: US 11,030,153 B2
(45) Date of Patent: *Jun. 8, 2021

(54) SYSTEM AND METHOD FOR STORING DATA WITH RULES ON CONTAINERS FOR COLLECTIONS OF DATA

(71) Applicant: Charles Nicholls, Los Angeles, CA (US)

(72) Inventor: Charles Nicholls, Los Angeles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/536,008

(22) Filed: Aug. 8, 2019

(65) Prior Publication Data
US 2019/0361846 A1 Nov. 28, 2019

Related U.S. Application Data

(63) Continuation of application No. 15/241,689, filed on Aug. 19, 2016, now Pat. No. 10,417,182.

(51) Int. Cl.
G06F 16/16 (2019.01)
G06F 16/93 (2019.01)

(52) U.S. Cl.
CPC ............ G06F 16/164 (2019.01); G06F 16/93 (2019.01)

(58) Field of Classification Search
CPC ............ G06F 17/3012; G06F 707/804; G06F 16/164; G06F 16/14; G06F 16/10; G06F 3/067; G06F 16/16; G06F 16/2365; G06F 16/24578; G06F 16/285; G06F 11/3485; G06F 16/113; G06F 16/122; G06F 16/1748; G06F 16/1827; G06F 16/1844; G06F 16/41; G06F 2003/0697; G06F 21/6218; G06F 3/0605; G06F 3/0631; G06F 3/0649; G06F 3/0667; G06F 11/1435; G06F 11/1453; G06F 11/1464; G06F 11/1469; G06F 12/1408; G06F 16/125; G06F 16/13; G06F 16/1752; G06F 16/178; G06F 16/182; G06F 16/184; G06F 16/185; G06F 16/252; G06F 16/316; G06F 16/86; G06F 21/10; G06F 21/602; G06F 21/64; G06F 2201/80; G06F 2201/84; G06F 2212/1052; G06F 2212/402; G06F 2221/0737;
(Continued)

(56) References Cited

U.S. PATENT DOCUMENTS 7,246,207 B2 * 7/2007 Kottomtharayil ..... G06F 3/0617
711/154
7,809,699 B2 * 10/2010 Passmore ............... G06Q 10/10
707/694

(Continued)

Primary Examiner — Sheree N Brown
(74) Attorney, Agent, or Firm — Bryan Fibel

(57) ABSTRACT

System and method are provided for storing data using programmable rules on containers for collections of data items presented through the operating environment. This invention gives a container (folders or enhanced containers) the ability to be more than a straight-forward receptacle to contain a collection of data objects and other sub-containers. The invention provides for when data is added to a container system, collecting information from the data item and any pre-existing metadata, matching the information to a container using the container's rules, and if any matching containers are found, filing of the data item proceeds into any candidate locations.

18 Claims, 7 Drawing Sheets

(58) Field of Classification Search
CPC ..... G06F 2221/2101; G06F 2221/2107; G06F 2221/2135; G06F 2221/2137; G06F 2221/2143; G06F 3/0604; G06F 3/0617; G06F 3/064; G06F 3/0647; G06F 40/20
USPC .......................................................... 707/804
See application file for complete search history.

(56) References Cited

U.S. PATENT DOCUMENTS

| | | | | |
|---|---|---|---|---|
| 7,958,307 | B2* | 6/2011 | Kavuri | G06F 3/0608 |
| | | | | 711/114 |
| 8,612,439 | B2* | 12/2013 | Prahlad | G06F 3/0649 |
| | | | | 707/736 |
| 8,799,331 | B1* | 8/2014 | de Vries | G06F 16/24575 |
| | | | | 707/804 |
| 8,996,592 | B2* | 3/2015 | Bardsley | G06F 16/2365 |
| | | | | 707/828 |
| 2002/0184250 | A1* | 12/2002 | Kern | G06Q 10/06 |
| 2006/0218180 | A1* | 9/2006 | Bodlaender | G11B 27/105 |
| 2007/0299806 | A1* | 12/2007 | Bardsley | G06F 16/164 |
| 2008/0282355 | A1* | 11/2008 | Nemazi | G06F 16/164 |
| | | | | 726/26 |
| 2010/0299490 | A1* | 11/2010 | Attarde | G06F 11/1453 |
| | | | | 711/162 |
| 2010/0333116 | A1* | 12/2010 | Prahlad | G06F 3/0649 |
| | | | | 719/328 |
| 2015/0205791 | A1* | 7/2015 | Bardsley | G06F 16/164 |
| | | | | 707/740 |
| 2016/0019224 | A1* | 1/2016 | Ahn | G06F 16/164 |
| | | | | 707/671 |
| 2016/0078245 | A1* | 3/2016 | Amarendran | H04L 67/10 |
| | | | | 713/193 |
| 2016/0210306 | A1* | 7/2016 | Kumarasamy | G06F 16/178 |
| 2018/0032258 | A1* | 2/2018 | Edwards | G06F 16/184 |

* cited by examiner

SYSTEM AND METHOD FOR STORING DATA WITH RULES ON CONTAINERS FOR COLLECTIONS OF DATA

CROSS REFERENCE TO RELATED APPLICATIONS

This application is a Continuation that claims priority from a non provisional U.S. patent application Ser. No. 15/241,689 filed on Aug. 19, 2016.

FIELD OF THE INVENTION

Embodiments of the invention generally relate to data processing systems and management of data. Specifically, embodiments of the invention relate to systems where data items are intelligently filed in programmable containers.

BACKGROUND OF THE INVENTION

Data processing systems, computers, networks of computers, or the like, offer users and programs various ways to organize and manage data via the operating system ("OS"). Data consists of a stored sequence of bits. A data object may include but is not limited to the contents of a file, a portion of a file, a data record, a page in memory, an object in an object-oriented program, a digital message or any other digital representation of information.

An OS on a computer generally provides a file system in which data items are organized and stored as files on a suitable storage medium. Files can be grouped into collections of files, known as directories, which can then be grouped into other directories. Users and programs must navigate through a hierarchical path of directories in order to find a particular data object (file). The OS provides for interaction with the file system via a "shell" or operating environment ("OE") which can be controlled through a command line or its equivalent graphical user interface In a database management system, data is organized as records in tables. These tables can be grouped into database files. Users and programs must query the database tables to find a particular data item (record) using a dedicated database application.

The existing data management structures provide little beyond organization and storage of data. Many decisions as to the organization and storage of data are made by the user in the manual creation of directories or by the OS with basic default directories (My Documents, My Pictures, etc.). Therefore, a need exists for the ability to create and manage containers and data using programmable rules.

SUMMARY

System and method are provided for storing data using programmable rules on containers for collections of data items presented through the operating environment. This invention gives a container (folders or enhanced containers) the ability to be more than a straight-forward receptacle to contain a collection of data objects and other sub-containers.

The invention provides for a system having least one processor and a database for storing records of inclusion rules defining which data objects are included in a container and exclusion rules defining what data objects are excluded from a container and correlations of the inclusion and exclusion rules containers in a data system organized by containers. The processor is configured to perform monitoring Operating System events signifying addition of a new data object into the data system. Upon addition of a data object into a data system organized by containers, the processor collects pre-existing metadata from the data object, extracts, by a processor, key information from content of the data object, analyzes the key information by interpreting and classifying content to create enhanced metadata, queries the database by performing phrase matching of the pre-existing metadata and enhanced metadata on the inclusion and exclusion rules, retrieves a set of containers correlated with matching inclusion and exclusion rules, and automatically stores a persistent copy of the data object in any and all matching containers on a data storage.

If matching containers are found, the user can additionally approve of each candidate location before filing of the data item proceeds. If no matching containers are found, one or more new containers can be suggested and the user approves of each container before the one or more containers are created and filing proceeds. If the user does not approve of at least one container, the user can file the data object manually. Alternatively, if the user does not want to file the object manually, the object is placed in a default container.

Further, after extracting key information from the data item content and any pre-existing metadata, the invention can provide for creating an enhanced data object using the key information. If any matching containers are found, filing of the enhanced data object proceeds into any candidate locations.

BRIEF DESCRIPTION OF THE DRAWINGS

The accompanying drawings taken in conjunction with the detailed description will assist in making the advantages and aspects of the disclosure more apparent.

DETAILED DESCRIPTION

Reference will now be made in detail to the present embodiments discussed herein, illustrated in the accompanying drawings. The embodiments are described below to explain the disclosed system, apparatus, and method by referring to the Figures using like numerals. It will be nevertheless be understood that no limitation of the scope is thereby intended, such alterations and further modifications in the illustrated device, and such further applications of the principles as illustrated therein being contemplated as would normally occur to one skilled in the art to which the embodiments relate.

The subject matter is presented in the general context of system and program modules that are able to read and write data to memory, physical storage, databases, or similar. Those skilled in the art will recognize that other implementations may be performed that may include different data structures, components, or routines that perform similar tasks. The invention can be practiced using various computer system configurations, such as client server systems. Other usable systems can include, but are not limited to, mainframe computers, microprocessors, personal computers, smart phones, tablets, and other consumer electronic devices. Such computer devices may include one or more processors, data storage in the form of memory (hard disk, random access memory, cache memory, etc.) or a database, and an OS.

System and method are provided for storing data using programmable rules on containers for collections of data items presented through the operating environment. The present invention provides for more efficiently and intelligently organizing data into enhanced programmable containers according to rules.

Data management systems have been developed with means to form groups of data items. For example, in a typical file system, users and programs can create collections of items in a file system by placing data files in directories and subdirectories. Data can also be organized using containers for making collections, giving users the ability to group files or other data objects according to their preference.

Figure 1:
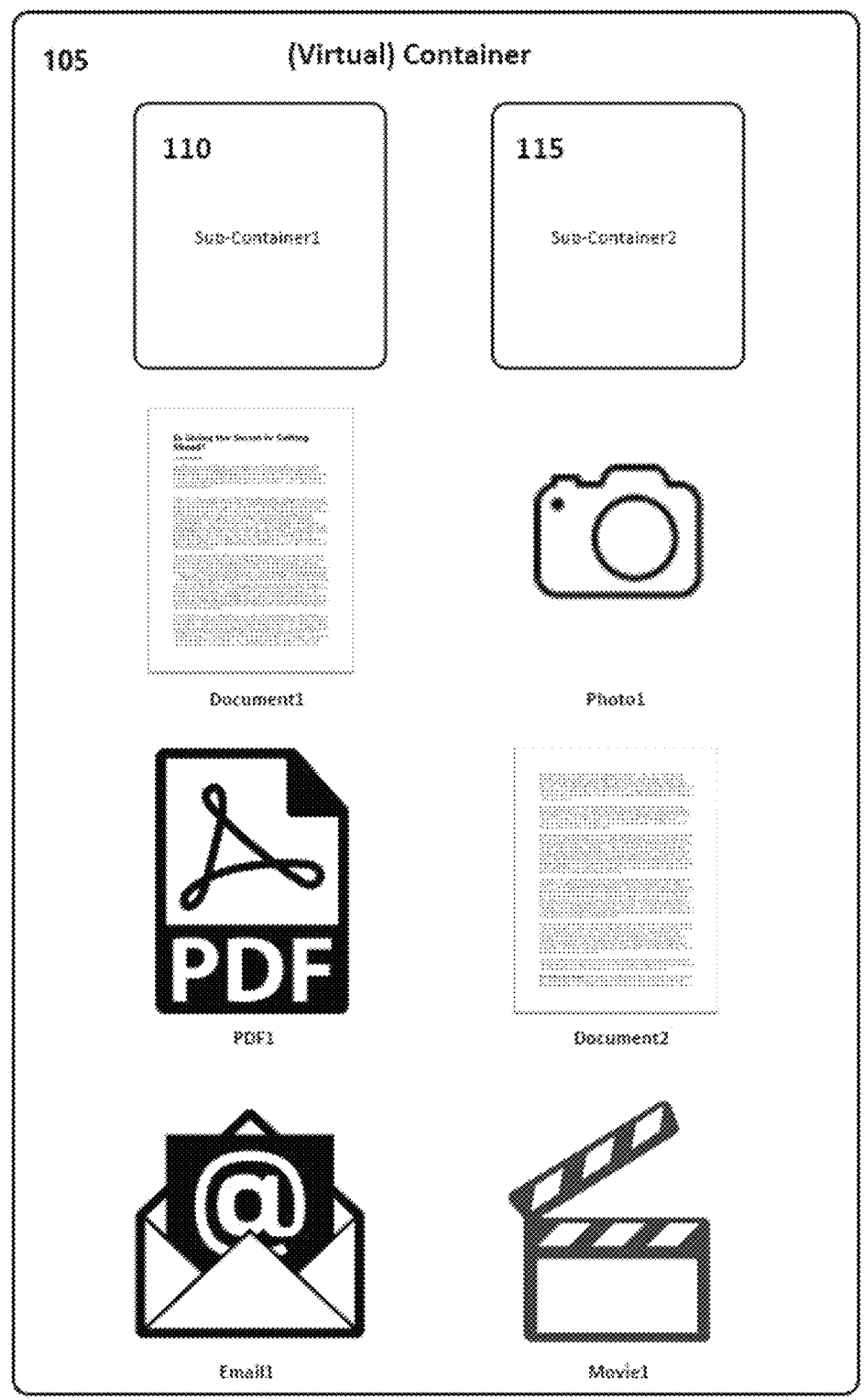
FIG. 1 is a diagram of a container and its contents.

As illustrated in FIG. 1, a container 105 for a collection of data is provided. The contents of such a container may be heterogeneous as to data format and storage type, provided that a suitable method of presentation of such heterogeneous data to the container system is present. Containers may contain various forms of data such as documents (text files, PDFs, etc.), pictures, multimedia (audio, video, movie, etc.), emails, and database records (provided, of course, such emails or database records can be ingested into the system as independent documents). Additionally, containers can contain other containers 110, 115, referred to as child container or sub-containers which may also contain heterogeneous data. In a file system, these containers are commonly referred to as folders, directories, sub-folders or sub-directories. A user can browse through containers and sub-containers to view data.

Data is organized in containers called folders in an OS file system, where the user is able to manually organize data files. When saving documents created by document editors or downloading attachments from email applications, the file's location can be set either automatically according to some default setting, or manually (users can browse through folder directories to select the location to place the data object), or a combination of both. Additionally, users can manually place data objects in folders using common file system commands such as cut, copy and paste.

An enhanced container system can provide virtual containers with the basic functionality of an OS file system. In an enhanced container system, document/data objects can be made to have more layers, properties and other attribute information than normal files in a file system. A data management application can present to the user a file management interface using enhanced containers.

This invention provides for the ability of containers (folders or enhanced containers) to be more than a straightforward receptacle to contain a collection of data objects and other sub-containers. Embodiments depicted provide for containers to have rules attached to a container, governing the content of the container to which they are attached.

An organization of containers can thus be created whose individual content is based on the properties of data items on the system and whose behaviors can be automated. For example, the system can be programmed to create a container for each email contact. Then, the container system can be programmed so that emails from the contact, downloaded email attachments from the contact, and other relevant data can be automatically added to the container.

The system uses the data item's information in order to file the data item in the appropriate container. Such a system may be implemented by collecting the normally available metadata and properties present in the data being organized. When additional information, properties or comprehension is available—such as that extracted by semantic analysis or document layout mapping—this may be used to enhance the subtlety and level of granularity by which the rules of the container system operates.

In an enhanced container system, document/data objects can be made to have more layers, properties and other attribute information than normal files in a file system. Such layers can include not only the original data, but also, for example the original content in machine readable form, the semantic extraction, content summary, and metadata. In order to extract the enhanced metadata used in filing and comprehension, every data item added to the system must be analyzed and have key information extracted. The extraction is based on recognizing text and uses existing metadata, as well as optical character recognition ("OCR") and semantic technologies. The system extracts information (people, dates, relationships, etc.) from the content, uses layout mapping to aid recognition of document types, uses semantic interpretation to classify content and extract a summary, and creates enhanced metadata. The extracted information is stored within the data object allowing the data management application to automatically add the object to the correct container according to the system rules.

Figure 2A:
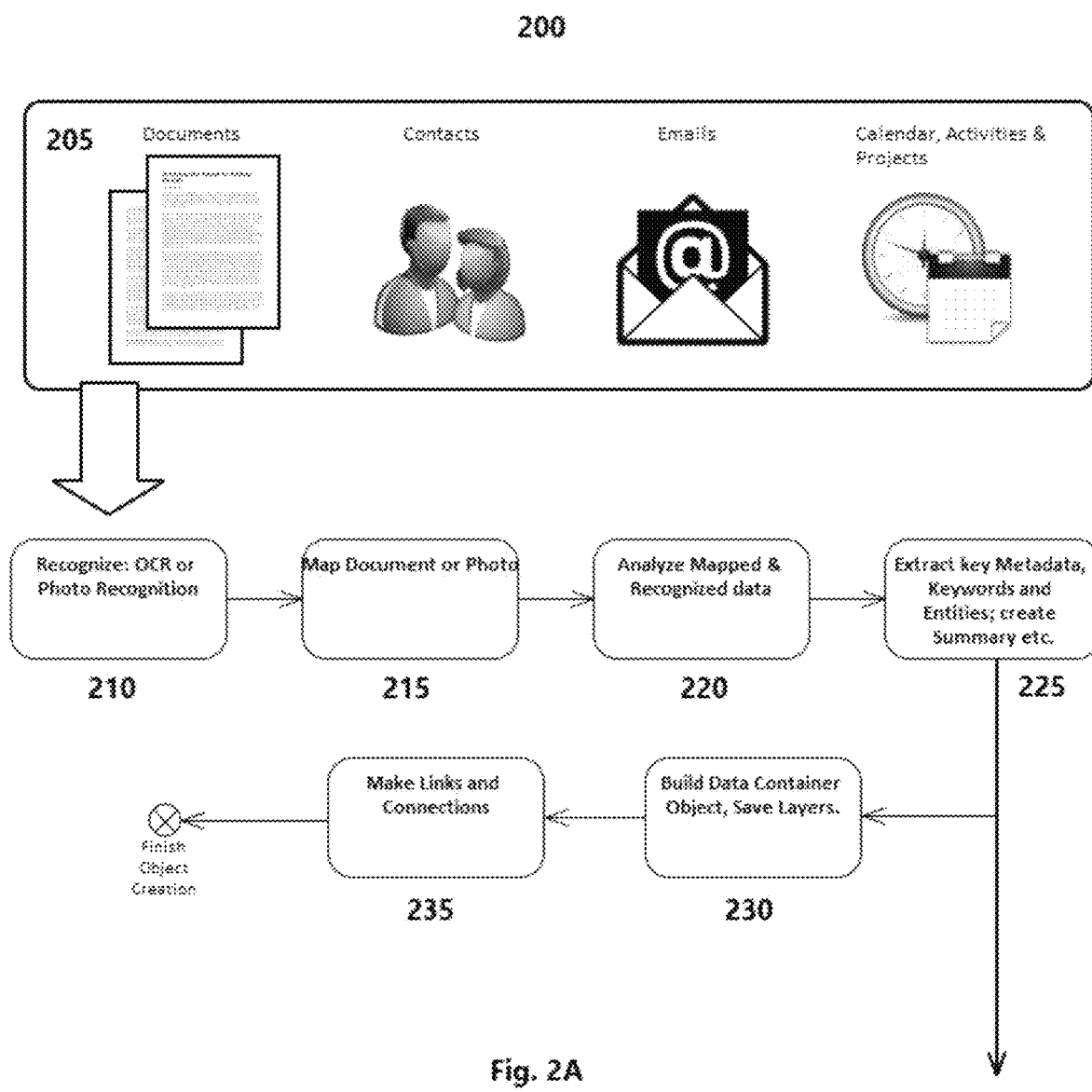
FIG. 2 is a flowchart of how data objects are automatically filed in a system.
Figure 2B:
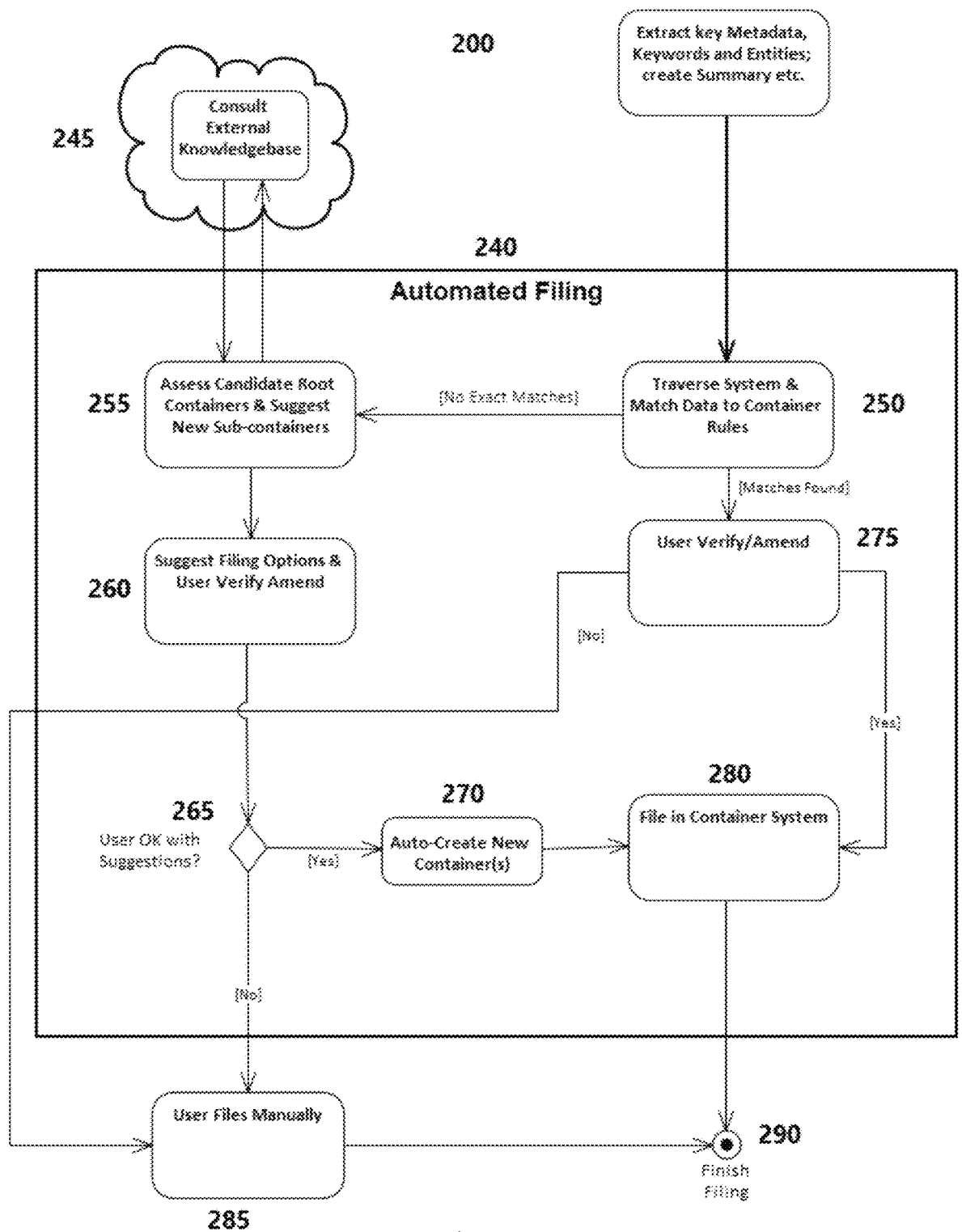

As illustrated in FIG. 2, a flowchart 200 of how data items are added as container members in a generalized automated container system implementation.

A new data item 205 is added to the system. If the system supports it and the data requires it, the incoming data may be, using OCR or otherwise, recognized 210, mapped 215 and semantically or otherwise analyzed 220. The system extracts key information (people, dates, relationships, etc.) from the content, uses semantic interpretation to classify content and extract a summary, and creates enhanced metadata 225. The system then builds the data object 230 and, if supported, makes links and connections as appropriate with objects in the system 235.

Automated filing 240 then proceeds. The system then attempts to match the information from the new item to existing containers' rules 250. If matches are found, the user verifies (or adjusts) the proposed filing 275 and filing proceeds in any candidate locations 280 and the filing is complete 290; the user may also opt to file manually by rejecting the proposed filing and proceeding to 285. If no matches are found the system may be equipped with a method of comparing the new item with the existing container hierarchy and proposing a new container for it within it 255, or it may have an external resource which it consults to provide additional assistance in determining and proposing a new location (by extending the hierarchy in a new way, or proposing modifications to the existing) 245. If this facility 255 exists, the new proposed container(s) or container structure is suggested to the user 260, and if he chooses to accept it 265, the new container(s) or container structure is created 270 and filing proceeds as before 280 through to conclusion 290. Should the user wish to proceed manually 285, he then completes filing at his discretion and concludes 290.

Some embodiments will not include extraction of data 210, 215, 220 or creation of enhanced metadata 225, and will only include the collecting of more basic information from the data item along with basic metadata. Still further, an implementation directly on an OS file system will not include the building of an enhanced data object 230 and some systems may not include the linking of related objects 235. In these embodiments, upon the creation 205 of a file in the system, automated filing proceeds 240.

The syntax of the Rules system is at the discretion of the system builder, and can be written in the general form:
[Include|Exclude] when {data|metadata|extraction}=*match predicate
The Comparison operator ("*" above) may be any of the standard types, such as less than, equals, contains. A rule may be a simple statement or complex construct which includes functions. Rules may be chained or combined through the use of "And" or "Or" operators. There can be as many matching phrases as needed in order to specify and isolate the data to be included or excluded in the container, provided these phrases do not contradict each other.

For example, a container may explicitly include or exclude certain data objects based on their type or their data content. The container system can behave according to a general pattern or Rule Statement:
when {metadata or semantic or object data} {match-predicate} {matching data pattern} then include or exclude {data object} in ContainerName
The container system can have a container called "Invoices":
When contentType is Invoice then include object in Invoice
This kind of test checks that the content type of a data object could be one of invoice and can be used for other documents, such as agreement, contract, or lease. If it matches, the system files the data object in the container.

Rules may be pre-programmed into a system as default specifications. Alternatively, rules can be programmed by end users.

A hierarchy of containers can be constructed in order to build a "knowledge tree" using rules. Such a tree would start with a broad definition and terminate in a precise item. It could bifurcate at certain points where there are two or more classes of objects meeting the higher requirement but differing or specializing at the lower level. Therefore container hierarchies might incorporate knowledge ontologies and object taxonomies, displaying these as trees or Venn diagrams. Each sub-branch of such a tree must be unique within the context of the major branch. Such a scheme does permit rules to be duplicated across disparate main branches and sub-branches always provided that each branch path along the tree creates a unique filter in the system.

Figure 3:
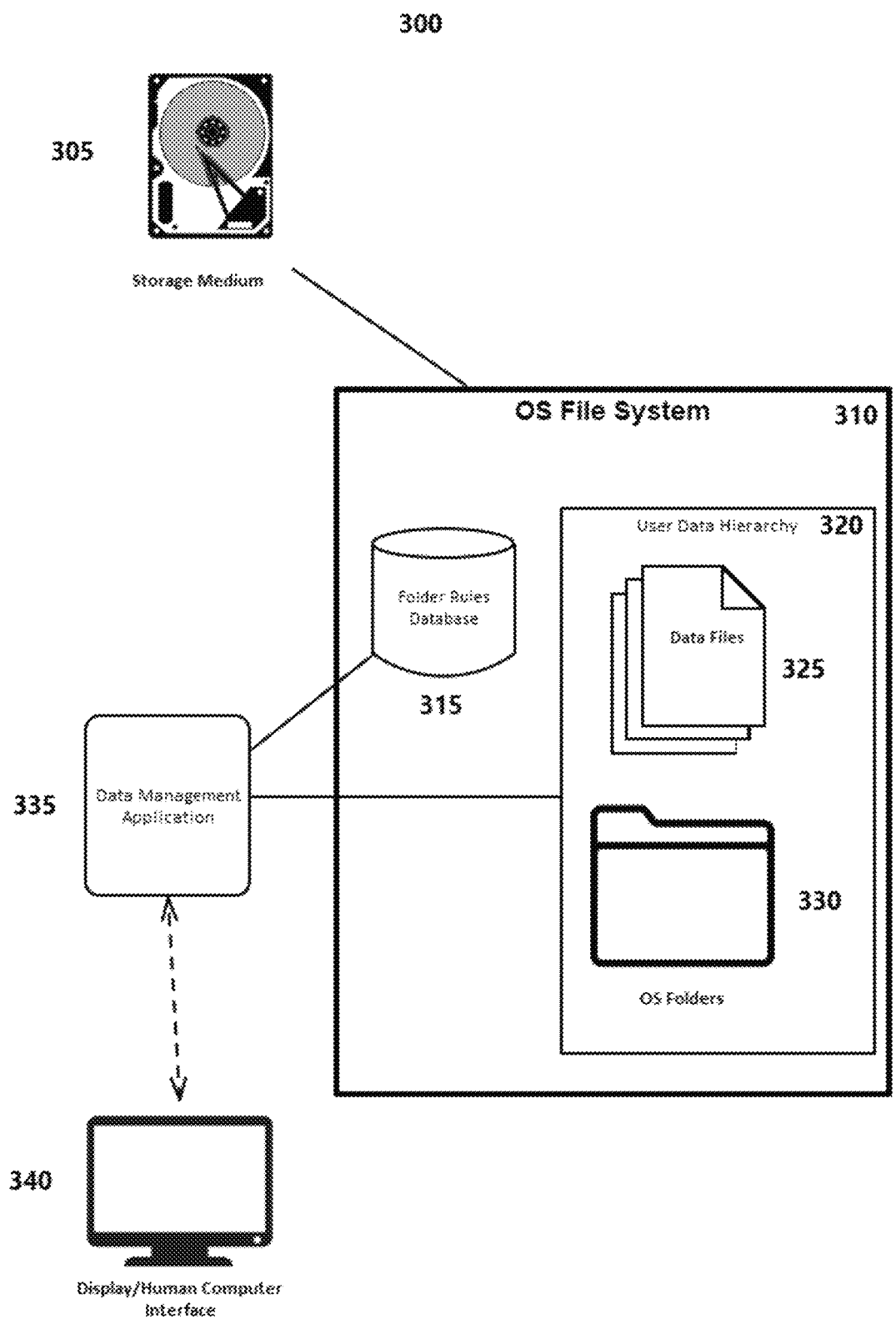
FIG. 3 is a block diagram of a general system embodiment on a single computer.

As illustrated in FIG. 3, a block diagram 300 of a general system embodiment on a single computer device is provided.

In a general system embodiment, a single computer device is configured to perform all elements of the invention. Some components of the computer include one or more processing units, storage medium 305 (hard disk, random access memory, cache memory, etc.), an OS, and an electronic visual display 340. Rules can be implemented, at the most basic level, by loading a Data Management Application 335 TSR program in memory, running in the background and monitoring changes in the OS file system 310. Such a Data Management Application 335 would provide an interface for the user to add rules and allow the user to connect the rules to new or existing OS folders 330 on disk. Rules would be stored in a Folder Rules Database 315. The system, using file metadata, or simple content analysis (search within the content if machine readable), collects and checks this metadata against the rules of the folders 330 and files 325 accordingly. All data is stored in OS file system folders and the user would still interact with the User File Hierarchy 320 through the OS file manager. The Data Management Application can additionally alerting the user if a file with new metadata appears and cannot be matched to the current rules sets and then proposing a new folder for the file. Aliases/shortcuts are used when a file overlaps multiple file folder rule sets and should be included in multiple folder locations. The user could also be alerted if he is trying to delete a files that has aliases in other folders, since the removal of the file will cause the aliases to no longer function.

Figure 4:
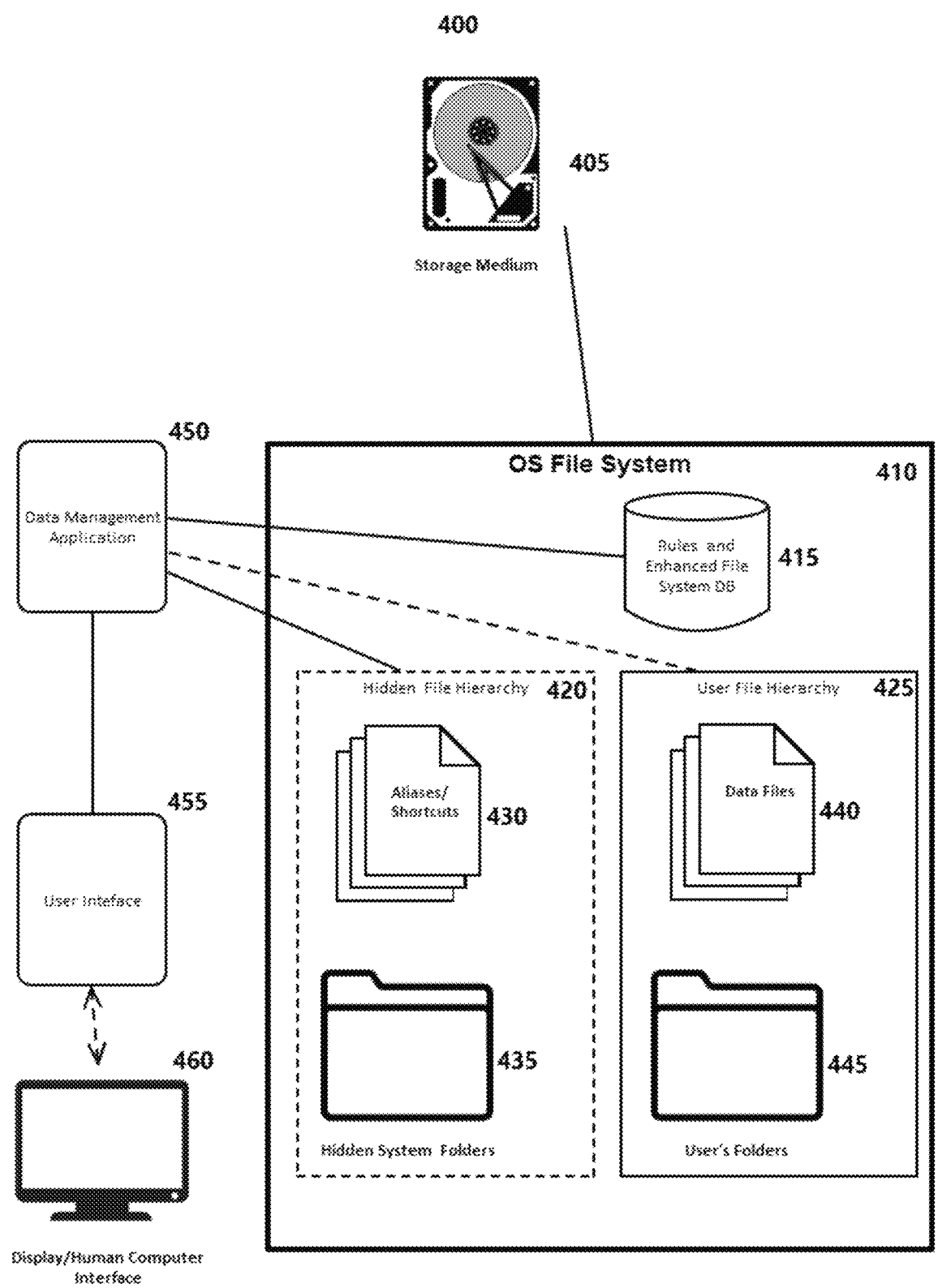
FIG. 4 is a block diagram of an alternative system embodiment on a single computer.

As illustrated in FIG. 4, a block diagram 400 of an alternative system embodiment on a single computer device is provided.

In an alternative system embodiment, a single computer device is configured to perform all elements of the invention. Some components of the computer include one or more processing units, storage medium 405 (hard disk, random access memory, cache memory, etc.), an OS, and an electronic visual display 460. Rules can be created via a Data Management Application 450, running in the background and monitoring changes in the OS file system 410. Such a Data Management Application 450 would provide an interface 455 for the user to add rules and allow the user to connect the rules to new or existing OS folders 445 on disk. Rules would be stored in a Rules and Enhanced File System Database 415. The Rules and Enhanced File System Database 415 also stores the location of files and folders along with basic metadata and enhanced metadata created from extractions. The system, using basic file metadata and enhanced metadata collects and checks the metadata against the rules of the folders 445 and files 440 accordingly. All data is still stored in OS file system folders but the user interacts with the User File Hierarchy 425 via the custom interface 455. The system would maintain a physical OS folder representation of the folder structure, but parts of it might not be accessible to the user. A hidden file hierarchy 420 would only be accessible through the User Interface 455 of the Data Management Application 450. This hidden file hierarchy 420 would consist of hidden system folders 435 and "files" in the form of aliases and shortcuts 430. The user can still interact with the User File Hierarchy 425 and edit files through the OS file manager outside of the application. Aliases and shortcuts can become broken if the underlying file is moved or deleted, which can compromise the integrity of the Data Management Application. To prevent this, the user's actions must be monitored by the Data Management Application 450 such that deletions and other destructive acts are forestalled.

Figure 5:
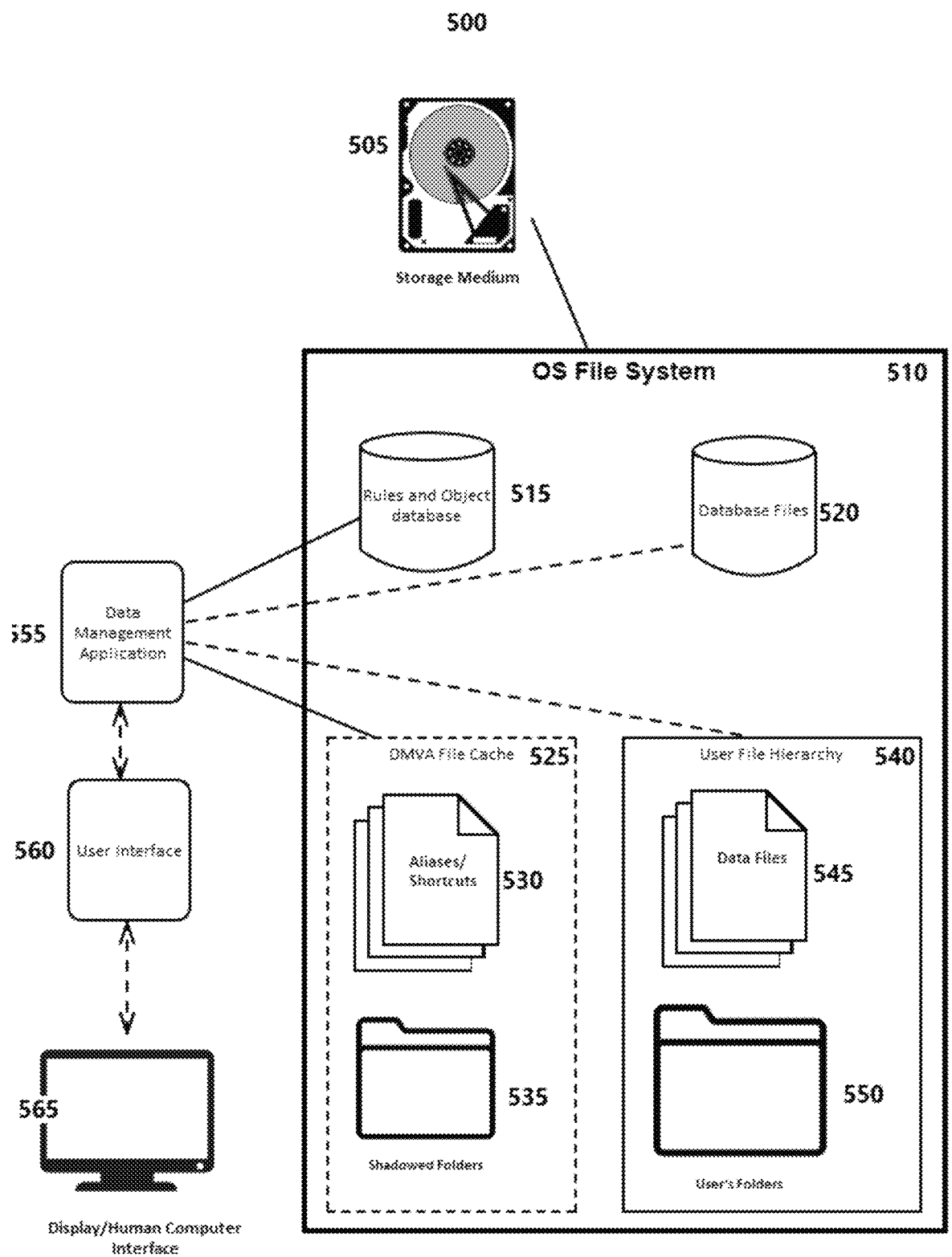
FIG. 5 is a block diagram of an alternative system embodiment on a single computer.

As illustrated in FIG. 5, a block diagram 500 of an alternative system embodiment on a single computer device is provided.

In an alternative system embodiment, a single computer device is configured to perform all elements of the invention. Some components of the computer include one or more processing units, storage medium 505 (hard disk, random access memory, cache memory, etc.), an OS, and an electronic visual display 565. A Data Management Application 555 can be loaded onto a computer, intermediating between the host OS file system 510 and its data files 545 and folders 550 as well as any database files 520. The Data Management Application 555 provides programmable containers into which the user may import data from available sources. Files are imported and information (enhanced metadata) extracted from the content and coupled to the OS metadata info. This information is attached to the file's record (a data object) in the Rules and Object Database 515. The data files 530 and shadowed folders 535 may additionally be stored on disk in a file cache 525, not easily accessible to the user and protected by file permissions from deletion or moving except via the app's interface. The enhanced containers are only be accessible through the User Interface 560 of the Data Management Application 555. Once data resides in the Data Management Application container hierarchy the user is empowered to group files in containers according to preference. These containers are virtual inasmuch as there may not be a physical folder on disk, although there could be, but all filing is done against virtual containers. Such a Data Management Application 555 would also provide an interface for the user to add rules and allow the user to connect the rules to new or existing containers. Rules would be stored in a Rules and Object Database 515. The system, using basic file metadata and enhanced metadata checks the metadata against the rules of the folders and files accordingly.

Figure 6:
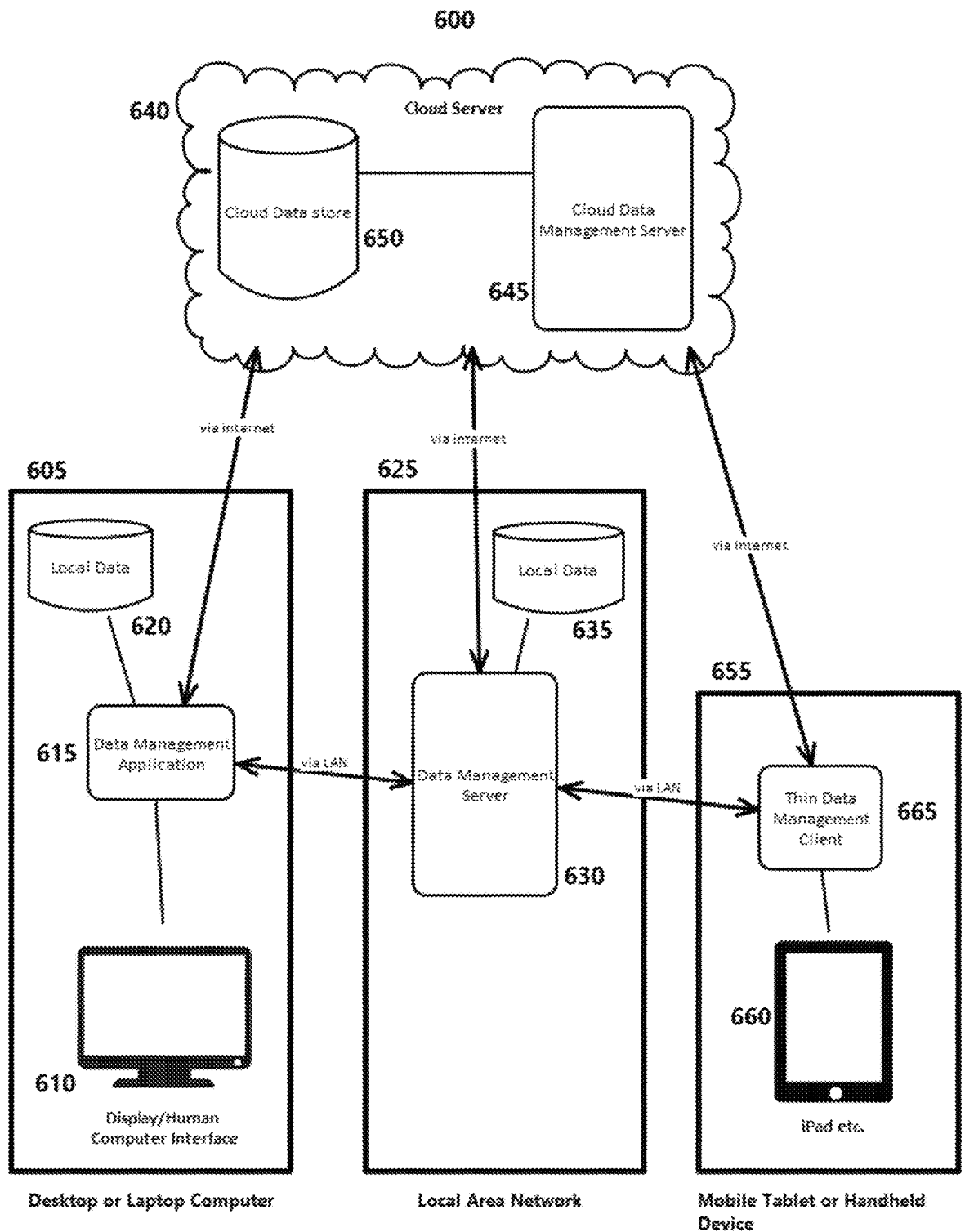
FIG. 6 is a block diagram of a general system embodiment on multiple computers.

As illustrated in FIG. 6, a block diagram 600 of a general system embodiment on multiple computer devices is provided.

Either of the 3 single computer embodiments can be modified to embodiments where the invention, performed over multiple computer devices in a client server configuration. As depicted, the user can interact with the system via a computer device 605. Some components of the computer include one or more processing units, storage medium (hard disk, random access memory, cache memory, etc.), an OS, and an electronic visual display 610. The computer device can be configured to run the Data Management Application 615 to create, manage and visualize the data as domains and member data objects. The data can be located directly on the computer device (local data 620) or can be accessed on a local area network server 625 or a cloud server 640 via the internet. The local area network server device 625 is configured with a Data Management server application 630 allowing for access to its own local data 635, as well as communication with the cloud server 640. The cloud server 640 is configured with a Data Management server application 645 allowing for access to it's the cloud data store 650, as well as communication with the client device 605 and local area network server 625 via the internet. The Data Management Application 615 is able to manage and synchronize local data 620 along with server data 635, 650 via the various data management applications. Further, a mobile device client 655, also with a visual display 660, can be configured with a thin Data Management Application 665 that can only access data on local area network server 625 or a cloud server 640. It should be appreciated that other computer system configurations can be used.

The preceding description is of various embodiments and no limitation of the scope is thereby intended.

That which is claimed is:

1. A computer-implemented method for automatically filing data objects into containers comprising:
   importing a set of preprogrammed inclusion rules defining which data objects are included in a container and exclusion rules defining what data objects are excluded from a container;
   correlating the inclusion and exclusion rules to containers in a data system organized by containers;
   storing records of the inclusion and exclusion rules and the correlated containers in a database;
   monitoring Operating System events signifying addition of a new data object into the data system;
   upon addition of a data object into a data system organized by containers:
   a) collecting pre-existing metadata from the data object;
   b) extracting key information from content of the data object;
   c) analyzing the key information by interpreting and classifying content to create enhanced metadata;
   d) querying the database by performing phrase matching of the pre-existing metadata and enhanced metadata on the inclusion and exclusion rules;
   e) retrieving a set of containers correlated with matching inclusion and exclusion rules;
   f) said computer, automatically storing a persistent copy of the data object in any and all matching containers on a data storage.

2. The method of claim 1, wherein if no matching containers are found, one or more new containers are created and automatic storing of a persistent copy of the data object proceeds in the one or more new containers on a data storage.

3. The method of claim 1, further comprising:
   before automatically storing a persistent copy of the data object in any and all matching containers, requiring a user to approve each matching container.

4. The method of claim 2, further comprising:
   before automatically storing a persistent copy of the data object in the one or more new containers, requiring a user to approve each matching container.

5. The method of claim 3, wherein if the user does not approve of at least one container, allowing a user to manually store a persistent copy of the data object in a container on a data storage.

6. The method of claim 4, wherein if the user does not approve of at least one new container, allowing a user to manually store a persistent copy of the data object in a container on a data storage.

7. The method of claim 4, wherein if the user does not approve of at least one new container, automatically storing a persistent copy of the data object in a default container on a data storage.

8. A computer-implemented method for automatically filing data objects into containers comprising:
   importing a set of preprogrammed inclusion rules defining which data objects are included in a container and exclusion rules defining what data objects are excluded from a container;
   correlating the inclusion and exclusion rules to containers in a data system organized by containers;
   storing records of the inclusion and exclusion rules and the correlated containers in a database;
   monitoring Operating System events signifying addition of a new data object into the data system;
   upon addition of a data object into a data system organized by containers:
   a) collecting pre-existing metadata from the data object;
   b) extracting key information from content of the data object;
   c) analyzing the key information by interpreting and classifying content to create enhanced metadata;
   d) creating an enhanced data object by adding the pre-existing metadata and enhanced metadata as object attributes;
   e) querying the database by performing phrase matching of the pre-existing metadata and enhanced metadata on the inclusion and exclusion rules;
   f) retrieving a set of containers correlated with matching inclusion and exclusion rules;

g) said computer, automatically storing a persistent copy of the enhanced data object in any and all matching containers on a data storage.

9. The method of claim 8, wherein if no matching containers are found, one or more new containers are created and automatic storing of a persistent copy of the enhanced data object proceeds in the one or more new containers on a data storage.

10. The method of claim 8, further comprising:
before automatically storing a persistent copy of the enhanced data object in any and all matching containers, requiring a user to approve each matching container.

11. The method of claim 9, further comprising:
before automatically storing a persistent copy of the enhanced data object in the one or more new containers, requiring a user to approve each matching container.

12. A system for automatically filing a data object in a container comprising:
at least one processor;
a database for storing records of inclusion rules defining which data objects are included in a container and exclusion rules defining what data objects are excluded from a container and correlations of the inclusion and exclusion rules containers in a data system organized by containers;
the at least one processor configured to perform:
monitoring Operating System events signifying addition of a new data object into the data system;
upon addition of a data object into a data system organized by containers:
a) collecting pre-existing metadata from the data object;
b) extracting, by a processor, key information from content of the data object;
c) analyzing the key information by interpreting and classifying content to create enhanced metadata;
d) querying the database by performing phrase matching of the pre-existing metadata and enhanced metadata on the inclusion and exclusion rules;
e) retrieving a set of containers correlated with matching inclusion and exclusion rules;
f) automatically storing a persistent copy of the data object in any and all matching containers on a data storage.

13. The system of claim 12, wherein if no matching containers are found, one or more new containers are created and automatic storing of a persistent copy of the data object proceeds in the one or more new containers on a data storage.

14. The system of claim 12, further comprising:
before automatically storing a persistent copy of the data object in any and all matching containers, requiring a user to approve each matching container.

15. The system of claim 13, further comprising:
before automatically storing a persistent copy of the data object in the one or more new containers, requiring a user to approve each matching container.

16. The system of claim 14, wherein if the user does not approve of at least one container, allowing a user to manually store a persistent copy of the data object in a container on a data storage.

17. The system of claim 15, wherein if the user does not approve of at least one new container, allowing a user to manually store a persistent copy of the data object in a container on a data storage.

18. The system of claim 15, wherein if the user does not approve of at least one new container, automatically storing a persistent copy of the data object in a default container on a data storage.

* * * * *